US008095909B2

(12) United States Patent
Eilam et al.

(10) Patent No.: US 8,095,909 B2
(45) Date of Patent: *Jan. 10, 2012

(54) SYSTEM AND METHOD FOR MODEL DRIVEN TRANSFORMATION FILTERING

(75) Inventors: Tamar Eilam, New York, NY (US); Michael H. Kalantar, Chapel Hill, NC (US); Alexander V. Konstantinou, New York, NY (US); David W. Levine, New York, NY (US); John A. Pershing, Jr., Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

This patent is subject to a terminal disclaimer.

(21) Appl. No.: 12/138,128

(22) Filed: Jun. 12, 2008

(65) Prior Publication Data

US 2008/0294420 A1 Nov. 27, 2008

Related U.S. Application Data

(63) Continuation of application No. 11/451,248, filed on Jun. 12, 2006, now Pat. No. 7,844,942.

(51) Int. Cl.
*G06F 9/44* (2006.01)
(52) U.S. Cl. ......... 717/104; 717/102; 717/107; 717/120
(58) Field of Classification Search .................. None
See application file for complete search history.

(56) References Cited

U.S. PATENT DOCUMENTS

| 5,596,746 | A | 1/1997 | Shen et al. |
|---|---|---|---|
| 6,493,691 | B1 | 12/2002 | Neuneier et al. |
| 6,625,648 | B1 | 9/2003 | Schwaller et al. |
| 6,681,383 | B1 | 1/2004 | Pastor et al. |
| 6,968,329 | B1 | 11/2005 | Chung et al. |
| 7,137,100 | B2 | 11/2006 | Iborra et al. |
| 7,236,963 | B1 | 6/2007 | LaMuth |
| 7,254,590 | B2 | 8/2007 | Mudunuri et al. |
| 7,551,629 | B2 | 6/2009 | Chen et al. |
| 7,721,270 | B2 | 5/2010 | Ukelson et al. |
| 7,761,844 | B2 * | 7/2010 | Bove et al. .................... 717/106 |
| 7,823,120 | B2 * | 10/2010 | Kazakov et al. ............. 717/104 |
| 7,971,180 | B2 * | 6/2011 | Kreamer et al. ............. 717/101 |
| 2003/0120593 | A1 | 6/2003 | Bansal et al. |

(Continued)

OTHER PUBLICATIONS

Title: A Moedl-Driven Transformation Method, author: Koehler et al, source: IEEE, dated: Sep. 16, 2003.* Title: Validation in model-driven engineering: testing model transformations, author: Fleurey et al, source: IEEE, dated: Nov. 2, 2004.*
U.S. Notice of Allowance mailed Jul. 26, 2010 in corresponding U.S. Appl. No. 11/451,248.
U.S. Office Action mailed Apr. 6, 2010 in corresponding U.S. Appl. No. 11/451,248.

*Primary Examiner* — Chameli Das
(74) *Attorney, Agent, or Firm* — Scully, Scott, Murphy & Presser, P.C.; Preston J. Young, Esq.

(57) ABSTRACT

A method and system for model-driven transformation are provided. The method and system in one aspect allows selecting of one or more model elements in a model. Transformation definitions are evaluated to identify one or more transformations that may be applicable to the selected one or more model elements. In one aspect, transformations may be identified that are applicable in an entire model, those that take the selected one or more model elements as input parameters, those that affect one or more model element, or any combination thereof. In one aspect, a list of applicable transformations is presented. In another aspect, the method and system automatically apply the one or more applicable transformations to the model.

20 Claims, 4 Drawing Sheets

U.S. PATENT DOCUMENTS

| | | |
|---|---|---|
| 2004/0181783 A1 | 9/2004 | Nagata et al. |
| 2005/0028156 A1 | 2/2005 | Hammond et al. |
| 2005/0216891 A1 | 9/2005 | Sundararajan et al. |
| 2006/0064667 A1* | 3/2006 | Freitas .......................... 717/104 |
| 2006/0106626 A1* | 5/2006 | Jeng et al. ........................ 705/1 |
| 2007/0006177 A1* | 1/2007 | Aiber et al. ................... 717/136 |
| 2007/0028221 A1 | 2/2007 | Ukelson et al. |
| 2007/0067756 A1* | 3/2007 | Garza .......................... 717/136 |
| 2007/0180424 A1* | 8/2007 | Kazakov et al. .............. 717/104 |
| 2007/0234277 A1* | 10/2007 | Lei et al. ....................... 717/104 |
| 2007/0288890 A1 | 12/2007 | Wells |
| 2008/0262822 A1 | 10/2008 | Hardwick et al. |
| 2009/0125546 A1 | 5/2009 | Iborra et al. |

\* cited by examiner

SYSTEM AND METHOD FOR MODEL DRIVEN TRANSFORMATION FILTERING

RELATED APPLICATIONS

This application is a continuation of U.S. Ser. No. 11/451,248, filed Jun. 12, 2006, now U.S. Pat. No. 7,844,942, the entire contents of which are incorporated herein by reference.

FIELD OF THE INVENTION

The present disclosure generally relates to computer systems and particularly to model-driven architecture, model-driven provisioning, and model tooling.

BACKGROUND OF THE INVENTION

In a model driven architecture (MDA) platform independent models (PIMs) are transformed into platform specific models (PSMs). In a typical scenario, the PIM expresses high-level requirements, while a PSM expresses their implementation over specific technologies, and resources. Initial applications of the MDA architecture have focused on patterns and transformations that work on computer program source code. For example, a model of a Java class may be transformed by applying the singleton pattern to generate a static instance, and a static method for creating and retrieving it. Similarly, an XML declaration of object type can be transformed into a Java RMI-based distributed object implementation deployed on WebSphere hosted on an AIX server. Existing tools, such as IBM Rational Software Architect (RSA), and Microsoft Visual Studio require that users first select the pattern or transformation to apply, and then bind its parameters. In the singleton example, an RSA user must first drag and drop the "Singleton" pattern from a pattern explorer tree to the model diagram and then drag and drop the class onto the pattern node.

MDA is increasingly being applied to new domains that go beyond source code transformations. For example, model transformations have been used to design the deployment of composite applications. A Logical Application Structure PIM is transformed using fine-grained "best-practice" transformations into a datacenter Deployment Topology PSM. Applying MDA approach in such as a domain is significantly more complicated for the following reasons:

Transformations may take several parameters, typically, a set of model elements.

Per-conditions for the execution of a transformation may exist. For example, a precondition may state that an input pair of model objects is connected via a link in the current model instance.

A sequence of model transformations may need to be applied on a PIM instance model in order to obtain a PSM for it.

There may be many PSM instances that can be reached from a given PIM instance by applying (different) sequences of transformations.

PSM instances that are reachable from a PIM in this way may vary in their quality, relative to some objective function.

Some model transformation sequences may lead to a model that is not yet a PSM but that cannot be further modified by applying transformations from a given set.

The approach of applying model transformations to map a PIM to a PSM guarantees correctness by design. However, selecting the best transformation to apply in a given state is a challenging task. While the selection of transformation to apply may depend on domain knowledge and domain preferences, the user can benefit from guidance and help in identifying the best transformation choice at a given model state. In particular, the user may want to filter the set of transformations according to multiple criteria such as: (1) what transformations are valid at a given state (2) what transformations take as an input model objects from a particular subset (3) what transformations affect model objects in a particular subset.

BRIEF SUMMARY OF THE INVENTION

A method and system for model-driven transformation filtering are provided. In one aspect, the method includes allowing selecting of one or more model elements in a model and identifying one or more transformations that are applicable to the one or more model elements selected. The step of allowing in one aspect may include allowing selecting an entire model and the step of identifying may include identifying one or more transformations that are applicable to one or more model elements in the entire model. In another aspect, the step of identifying may include identifying one or more transformations that take one or more input parameters from the selected one or more model elements. Yet in another aspect, the step of identifying may include identifying one or more transformations that affect the one or more selected model elements. Still yet in another aspect, the method may include any combination of the above identifying steps.

The method may also include applying the one or more transformations to the model. The method may further include presenting the one or more transformations. The step of identifying may further include determining which transformation from the one or more transformations to apply to the model.

A system for model-driven transformation filtering in one aspect includes a transformation tooling environment operable to allow selecting of one or more model elements in a model. The model editing environment is further operable to identify one or more transformations that are applicable to the one or more model elements selected.

The system in another aspect may further include at least a graphical user interface operable to allow a user to select the one or more model elements and to present the one or more applicable transformations. In one aspect, the graphical user interface is further operable to provide visual aids. In another aspect, the graphical user interface is operable to highlight the one or more transformations.

The transformation tooling environment in one aspect may be a functionality provided in a model editing environment. The transformation tooling environment may be further operable to apply the one or more transformations to the model. Still yet, the transformation tooling environment may be further operable to present the one or more transformations. The transformation tooling environment is operable to identify one or more transformations that are applicable to one or more model elements in an entire model, identify one or more transformations that take one or more input parameters from the selected one or more model elements, identify one or more transformations that affect the one or more selected model elements, or any combination thereof.

Further features as well as the structure and operation of various embodiments are described in detail below with reference to the accompanying drawings. In the drawings, like reference numbers indicate identical or functionally similar elements.

DETAILED DESCRIPTION

Figure 1:
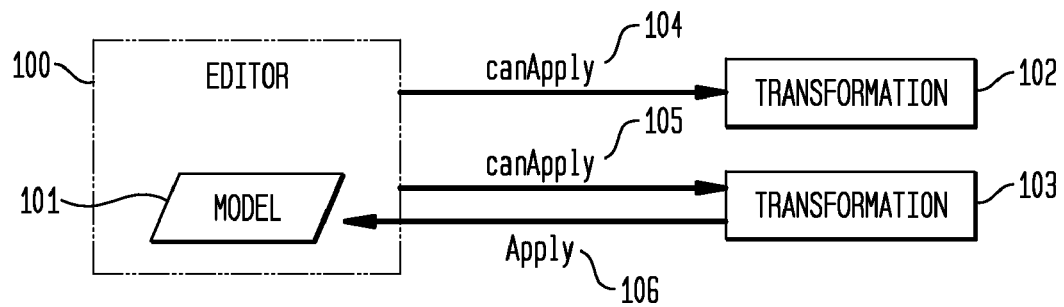
FIG. 1 is diagram illustrating an architectural layout of the present disclosure in one embodiment.

Given a model and a set of model transformations the present disclosure in an exemplary embodiment provides a method and system for filtering a set of transformations. Filtering may be based on a model instance and one or more filter criteria such as on the selected elements of the model, the preconditions of the transformations, and/or the elements in the model that will be affected by the execution of the transformation. Transformation preconditions may include restrictions on the transformation parameter types, their attributes, and relationships. A model generally comprises of elements, which may be typed and associated with attributes. Model elements may contain or depend on other model elements. Transformations operate over a set of model elements and relationships. A transformation may change the model or create a new model. A transformation can be associated with zero or more preconditions on the state and relationships of its model element parameters. The set of model transformations can be filtered according to criteria defined by a user. For example,

- Identify transformations that are applicable in the current model (all preconditions are satisfied).
- Select a model element, or a set of model elements, and identify the set of transformations that take input parameters from the selected set.
- Select a model element, or a set of model elements, and identify the set of transformations that affect model elements in the set (i.e., changing, or deleting, or adding relationship to elements in the set).
- Any combination of the above.

Given a model and a set of transformations, the method and system of the present disclosure in one embodiment supply a filtered list of transformations based on a filtering criteria defined by the user. For example, a configuration model of a computer network may include two elements of type system, connected with a logical communication dependency, whose secure attribute is set to true. The insert-firewall transformation takes as a single parameter a logical secure communication dependency, and replaces it with a firewall, and appropriate network-level connections to the two systems. In this example, the type of the transformation parameter is a relationship of type "logical communication dependency". Also in this example, the preconditions of the transformation are that (1) the relationship endpoints have been defined, (2) the secure attribute of the relationship argument is set to the Boolean "true" value, and (3) the logical communication dependency has not been previously materialized. In models with multiple such dependencies, the transformation may be applied to multiple element combinations. Presently, Model Driven Architecture (MDA) systems expose such a transformation to the user as part of a list of all possible model transformations. They do not filter the list based on the model state, including the existence of object instances of the required types, their attributes, and relationships. Neither do they identify the locations in the model where the transformation can be applied. Instead, the user is expected to select the transformation and identify its parameters from the set of model elements. In an exemplary embodiment of the present disclosure, the parameters and preconditions of the transformations is considered to present the user with only the transformation that can be applied to the current model selection. The selection may include all model elements or a subset of elements. The method may also include identifying possible groups of parameters to the transformation, for example, to simplify the task of transformation parameterization.

FIG. 1 is a diagram illustrating the architecture of the present disclosure in one embodiment. A model 100 is instantiated in a model editing environment 100. A model editing environment 100, for example, enables creating and modifying models. Examples of known model editing environment include IBM Rational Software Architect (RSA) and Microsoft Visual Studio. A model editing environment in the present application may provide all the functionalities of a known model editing environment. For instance, a user may utilize a model editing environment 100, for example, to create and modify models. In addition, the editing environment 100 of the present disclosure supports transformations on the model. An editor in the model editing environment 100 of the present disclosure in one embodiment queries the transformations 104,105 to determine which transformations can be applied to the model elements, for example, selected by a user. In one embodiment, all transformations are queried. Transformations for example may be added to the model editing environment as local configuration and code. Transformations also may be added to the model editing environment as references to remote asset repositories. The model editing environment may retrieve all remote transformations for local querying, or perform remote queries on the asset repositories for transformation parameter types, and preconditions. In an exemplary embodiment of the present disclosure, the filtered transformation list is compiled and provided to the requesting user. The transformation list may be presented in a visual manner for human user use and/or as a data structure for machine or human use.

In one embodiment of the present disclosure, a method is provided to check for transformation application. In one embodiment, input parameters to the method include one or more model elements. Transformations can affect one or more model elements by changing attributes, deleting, or adding model elements. The transformations are filtered based on the types of the model elements selected. For example, if a transformation is parameterized by an instance of type X, but no such instances are present in the selected model element set, then the transformation is filtered out. For the remaining transformations, permutations of instances of their parameter types are created and the preconditions are tested. The method may test all permutations, or stop when the first permutation whose preconditions are satisfied is found for a transformation, at which point the transformation may be added to the filtered-in list. The permutations of parameters may be performed blindly, or may be guided by analysis of the preconditions to reduce the number of combinations that need to be checked.

The set of transformations can be also filtered based on the set of model elements that they affect. In one embodiment, this may be done blindly by simulating the effect of every transformation in the set, and filtering out the transformations whose effect does not change model elements in the set. In another embodiment, filtering based on the set of model elements that they affect may be performed by analyzing their declaration if the transformations are defined using a declarative language. The filtering criteria may be further refined. For example, one or more transformations may be identified that affect at least one element in the selected "affect state", or that only affect elements in the selected "affect set", etc. Affect state describes for example, type of effect or how an element is affected.

As an example, a user may select a communications node from the model being considered. The system and method of the present disclosure then may identify all possible transformations and matches that can take that node as a parameter. As another example, the user may select a Server node. The method of the present disclosure may identify all possible transformations and matches whose execution will affect the Server node by changing its attributes or adding relationships between it and other model elements. Yet as another example, the user may define an "input set" of model elements, and an "affect set" of model elements. In one embodiment of the present disclosure, the set of transformations may be filtered to identify all transformations that take their input from the "input set" and affect elements in the "affect state".

The system and method of the present disclosure may output, in one embodiment, a filtered list of transformations that can be validly applied and present the list to a user. In another embodiment, an automated process may select one or more of the applicable transformations and automatically apply the transformation 106 to the model 101.

Figure 2:
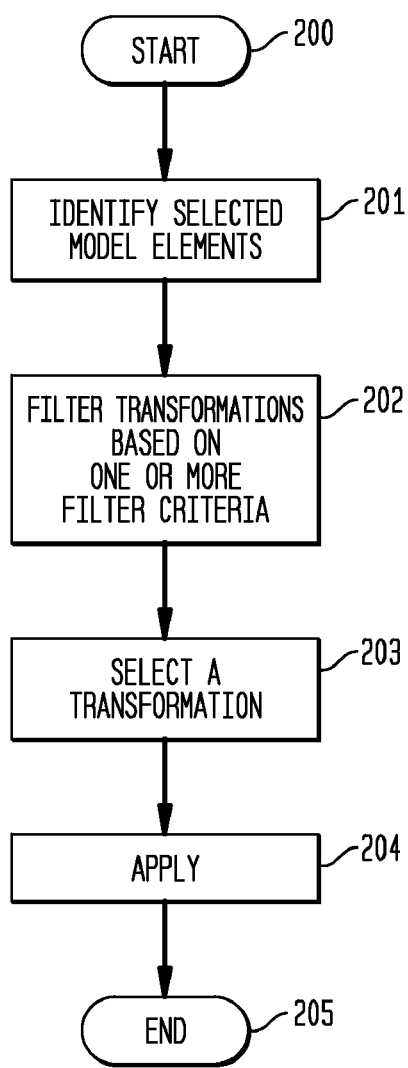
FIG. 2 is a flow diagram illustrating a method for applying a single transformation in one embodiment of the present disclosure.

FIG. 2 is a flow diagram illustrating a method for applying a single transformation in one embodiment of the present disclosure. At 200, a user or computer process or the like starts by identifying one or more selected model elements at 201. In one embodiment of the present disclosure, if no elements have been selected, then all model elements may be considered. The method in one embodiment at 202 filters the available transformations based on one or more filter criteria, for instance, those whose preconditions apply and/or those that affect one or more elements. For example, the model editing environment may identify two initial candidate transformations, one that inserts a firewall for logical connectivity relationships whose security property is true, and another that inserts a VLAN for logical connectivity relationships whose security property is false. Given a model element selection that does not include any logical connectivity relationships, both transformations will be filtered out. If the model elements selected include one or more logical connectivity relationship objects, all of whose secure attributes are set to true, only the insert firewall transformation will be kept. At 203, transformation is selected. At 204, the selected transformation is applied to the model. The model and/or model elements may be selected by a human user, for example, using a human-machine interface, or by an automated process, such as a search engine. At 205, the method returns.

Figure 3:
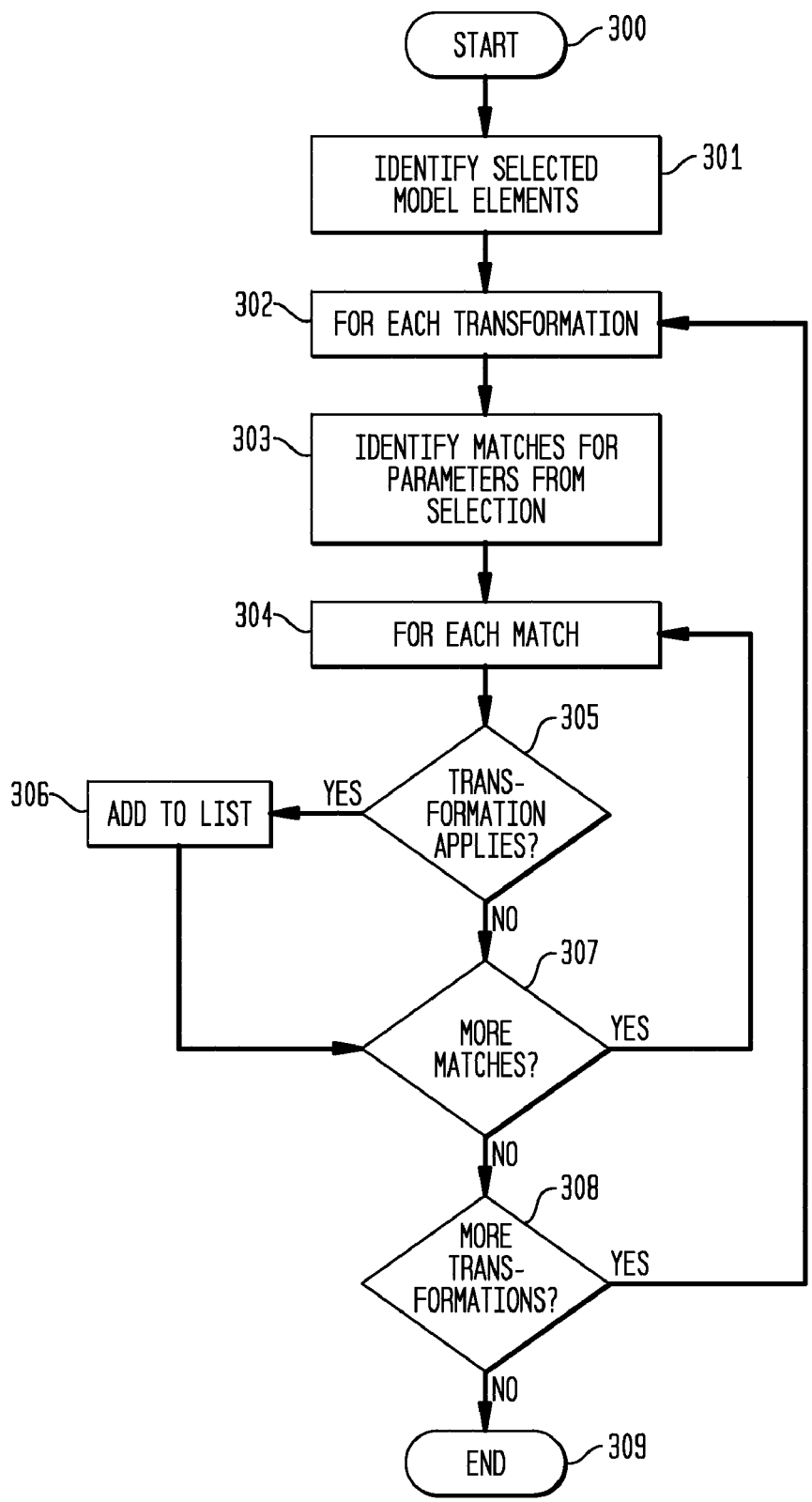
FIG. 3 shows an example of an implementation of the method shown in FIG. 2.

FIG. 3 shows an example of an implementation of the method shown in FIG. 2. At 300, a user or computer process or the like starts by identifying one or more selected model elements at 301. For each transformation defined 302, combinations of parameters from the selected model elements (matches) are found 303. For example, a transformation to assign a switch port to a VLAN may take as parameters a switch port object, and a VLAN object. A precondition may be that the VLAN be defined in the switch containing the switch port. Take, for example, selected model elements that include two ports sp1 and sp2 and two VLANs vlan1 and vlan2, where sp1 is contained in switch sp1, vlan1 and vlan2 are defined on switch sw1, but not on switch sw2, whereas sp2 is contained in switch sw2. The matches in this example will include the permutations (vlan1, sp1), (vlan1, sp2), (vlan2, sp1), (vlan2, sp2). Of these permutations, only (vlan1, sp1), and (vlan2, sp1) will satisfy the preconditions. For each match 304, the method in one embodiment checks if the transformation applies 305. In the previous example, of the four permutations only (vlan1, sp1) and (vlan2, sp1) will satisfy the preconditions. If it applies, it is added to the list bound to the match for which it can be applied at 306. In this example, the bound results added to the list are (T1, vlan1, sp1), (T1, vlan2, sp1) where T1 is the identifier of the transformation. The method in one embodiment repeats at 307 for each match, and transformation at 308. In one embodiment, it ends or returns when all transformations have been examined.

Figure 4:
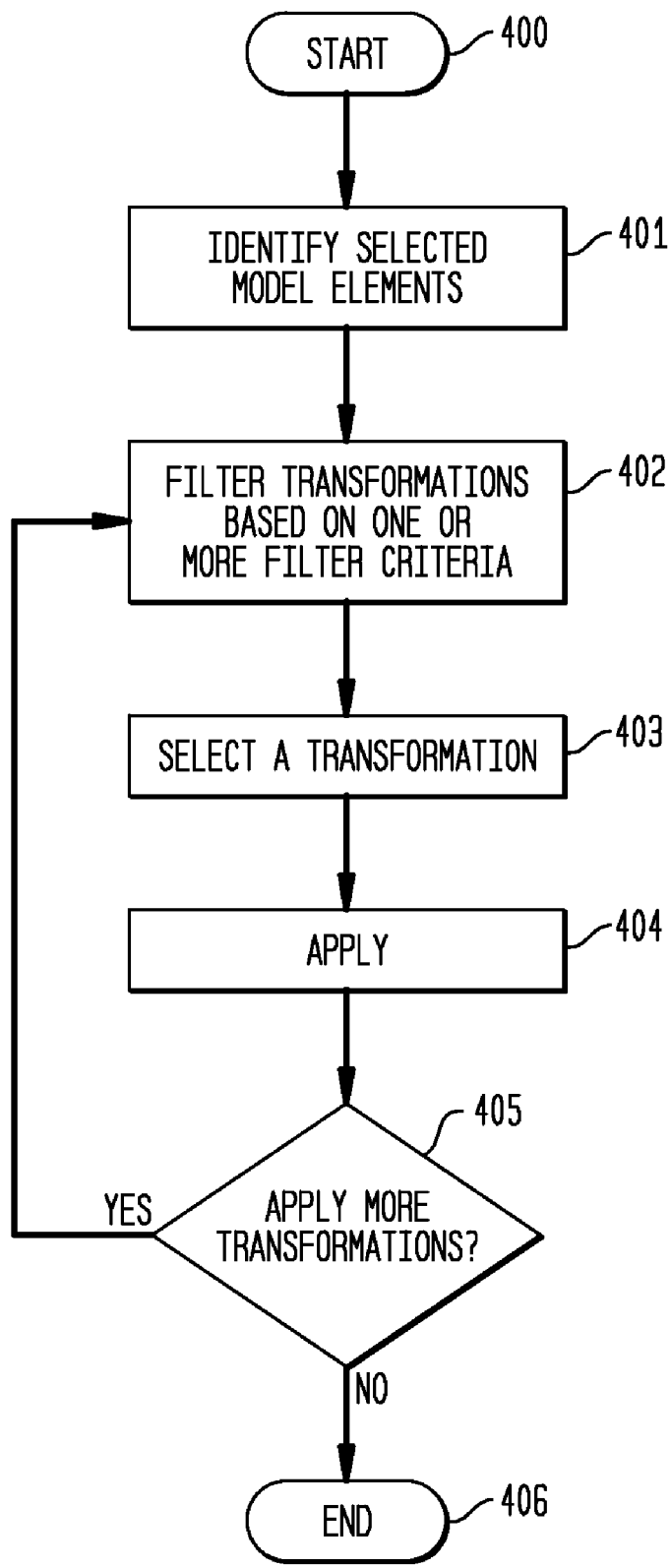
FIG. 4 is a flow diagram illustrating a method in which a user or computer process or the like applies multiple transformations to a model.

FIG. 4 is a flow diagram illustrating a method in which a user or computer process or the like applies multiple transformations to a model. At 401, one or more selected model elements are identified. At 402, one or more transformations are identified based on one or more filter criteria, for example, those whose preconditions apply and/or those that affect one or more elements. At 403, a transformation is selected, for instance, from the list of transformations whose preconditions apply. At 404, the selected transformation is applied, as for example shown with reference to step 203 in FIG. 2. In one embodiment of the present disclosure, after applying a transformation the method may return at 405 to 402 to filter the transformations again based on the new model created by applying the last transformation in 404.

Figure 5:
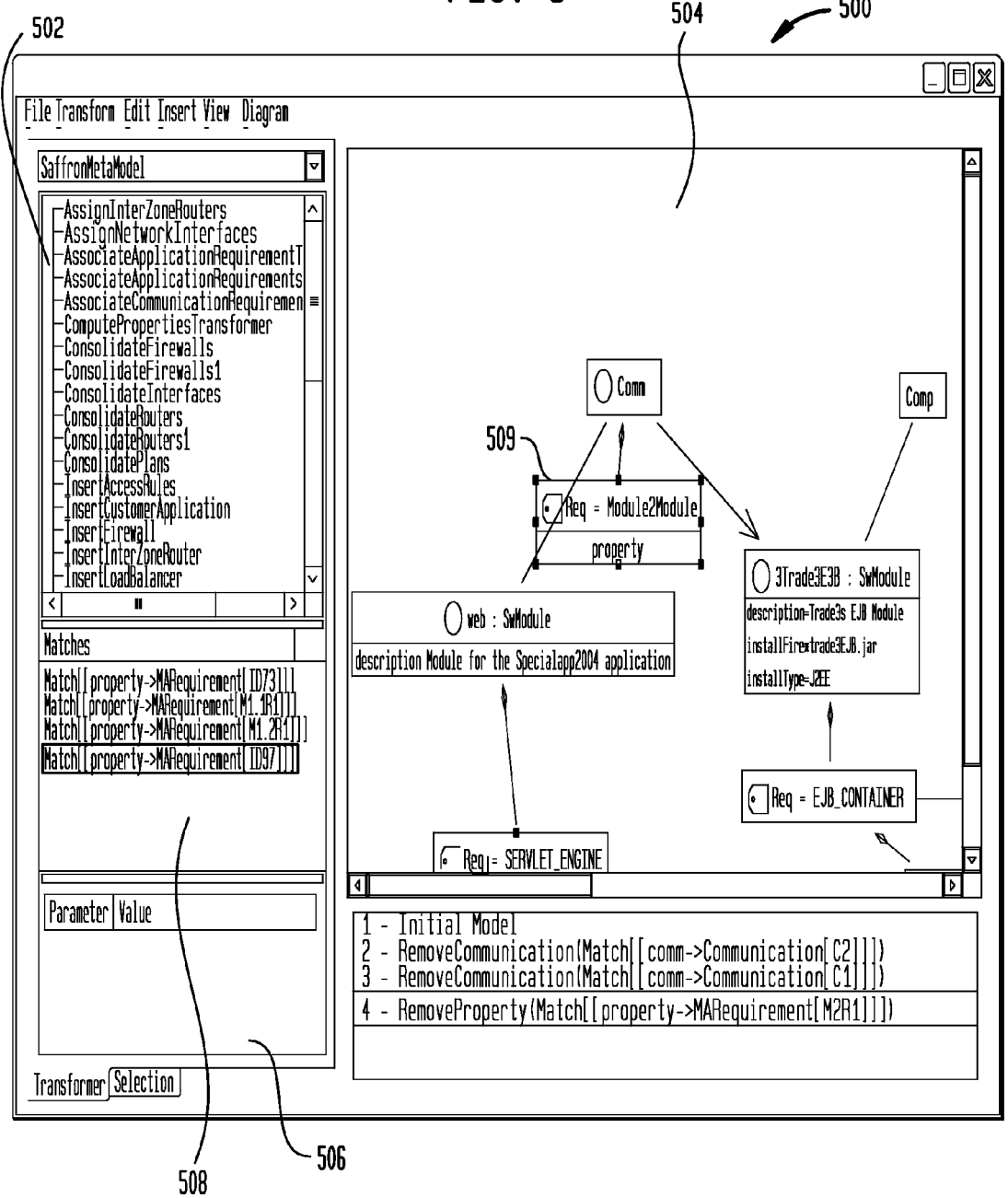
FIG. 5 is an example of a screen shot showing the graphical editor of the present disclosure in one embodiment.

In one embodiment, an editing environment (FIG. 1 100) may include a graphical user interface (GUI) for allowing user interaction with the system and method of the present disclosure. FIG. 5 is an example of a screen shot 500 showing a graphical editor of the present disclosure in one embodiment. The graphical editor in one embodiment may provide sections or views that show one or more transformations 502, the model 504, and one or more parameters to the transformation 506. In one embodiment, the transformer view 502 shows a list of all transformers, highlighting the ones whose parameters are instantiated in the model from those whose parameters do not exist, and distinguishing ones where the preconditions are satisfied, from those that are not. In one embodiment, the editor may include various visualization aids. For instance, the above-mentioned highlighting of transformations, for example, may be color-coded for easy viewing in one embodiment. Possible matches in models for each transformation may also be highlighted, and for each match, model elements may be highlighted. Further, transformations with failed constraints may be highlighted. After applying transformation, the changes to the model may be also highlighted.

The transformer view 502 shown is one example of a number of possible filtering views that may be provided in the present disclosure. The match view 508 in one embodiment shows the model element subsets where a transformer can be applied. When selecting a match, its corresponding elements are highlighted in the model editor. As shown in FIG. 5, after selecting a match 508 for a transformation, thereby identifying the parameter bindings, the elements parameters of the transformation are visually identified at 509. The transformer parameter view 506 in one embodiment enables users to provide additional parameters to the transformation for values that are not model elements. For example, the create-vlan transformation may declare an optional parameter for setting the VLAN ID. Such parameters can be supplied by the user to assist the transformation in setting the properties of the object which it accesses. A history view may record the sequence of transformations applied and on which matches were evaluated. In another embodiment, context-sensitive filters may be used to show a list of transformations on the selected elements.

In an exemplary embodiment of the present disclosure, the above-described transformation tooling may be provided within a model editing environment, for instance, as an MDA transformation development, debugging, and execution environment. In this environment, transformations may be declared against a set of typed parameters over any modeling level, for example, meta-meta model, meta-model, and/or model instance. Transformations may be further associated with constraints on their parameters. The debugging environment may monitor the state of the model being transformed, and filter the display of available transformations based on the availability of model elements matching the parameter types and constraints. The debugging environment may further support the visualization of different model element subsets where each transformation can be applied.

Users may explore transformations by selecting subsets of model elements, for instance, to further restrict the possible number of transformations, and transformation matches. Users may visualize subsets of the model which express task-specific views. When editing in a view, a user may further filter the set of transformations to those that can be applied to the currently visible model elements. In one embodiment, when the user applies a transformation, the transformed subset of model elements is clearly identified, and the changes are highlighted.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for model-driven transformation filtering, comprising:
   allowing selecting of one or more model elements in a model; and
   identifying one or more transformations that are applicable to the one or more model elements selected, the identifying including:
      filtering, by a processor, said one or more transformations based on a state of a model instance and one or more filter criteria including said one or more selected model elements, one or more preconditions of transformation, and/or elements affected by execution of transformation, said one or more preconditions include one or more restrictions on transformation parameter types, attributes, and relationships,
   wherein said one or more transformation can be selected for applying to said one or more model elements.

2. The method of claim 1, wherein the step of allowing selecting includes allowing selecting an entire model and the step of identifying includes identifying one or more transformations that are applicable to one or more model elements in the entire model.

3. The method of claim 1, wherein the step of identifying includes:
   identifying one or more transformations that take one or more input parameters from the selected one or more model elements.

4. The method of claim 1, wherein the step of identifying includes:
   identifying one or more transformations that affect the one or more selected model elements.

5. The method of claim 4, wherein the step of identifying one or more transformations that affect the one or more selected model elements includes:
   simulating each defined transformation; and
   filtering out one or more transformations whose effect does not change the one or more selected model elements.

6. The method of claim 4, wherein the step of identifying one or more transformations that affect the one or more selected model elements includes:
   analyzing one or more declarations associated with each transformation defined using a declarative language.

7. The method of claim 4, wherein the step of identifying one or more transformations that affect the one or more selected model elements includes:
   identifying one or more transformations that affect at least one model elements in a selected affect state.

8. The method of claim 4, wherein the step of identifying one or more transformations that affect the one or more selected model elements includes:
   identifying one or more transformations that only affect one or more model elements in a selected affect set.

9. The method of claim 1, further including:
   applying the one or more transformations to the model.

10. The method of claim 1, further including:
    presenting the one or more transformations.

11. The method of claim 1, wherein the step of identifying further includes determining which transformation from the one or more transformations to apply to the model.

12. A system for model-driven transformation filtering, comprising:
    a processor;
    a transformation tooling environment operable execute on the processor, and further operable to allow selecting of one or more model elements in a model, a model editing environment further operable to identify one or more transformations that are applicable to the one or more model elements selected, the identifying including:
    filtering said one or more transformations based on a state of a model instance and one or more filter criteria including said one or more selected model elements, one or more preconditions of transformation, and/or elements affected by execution of transformation, said one or more preconditions include one or more restrictions on transformation parameter types, attributes, and relationships,
    wherein said one or more transformation can be selected for applying to said one or more model elements.

13. The system of claim 12, further including at least a graphical user interface operable to allow a user to select the one or more model elements and to present the one or more applicable transformations.

14. The system of claim 13, wherein the graphical user interface is further operable to provide visual aids.

15. The system of claim 13, wherein the graphical user interface is further operable to highlight the one or more transformations.

16. The system of claim 12, wherein the transformation tooling environment is a functionality provided in a model editing environment.

17. The system of claim 12, wherein the transformation tooling environment is further operable to apply the one or more transformations to the model.

18. The system of claim 12, wherein the transformation tooling environment is further operable to present the one or more transformations.

19. The system of claim 12, wherein the transformation tooling environment is operable to identify one or more transformations that are applicable to one or more model elements in an entire model, identify one or more transformations that take one or more input parameters from the selected one or more model elements, identify one or more transformations that affect the one or more selected model elements, or combination thereof.

20. A program storage device readable by machine, tangibly embodying a program of instructions executable by the machine to perform a method of model-driven transformation filtering, comprising:

allowing selecting of one or more model elements in a model; and identifying one or more transformations that are applicable to the one or more model elements selected, the identifying including:

filtering said one or more transformations based on a state of a model instance and one or more filter criteria including said one or more selected model elements, one or more preconditions of transformation, and/or elements affected by execution of transformation, said one or more preconditions include one or more restrictions on transformation parameter types, attributes, and relationships, wherein said one or more transformation can be selected for applying to said one or more model elements.

* * * * *